Patented Feb. 24, 1942

2,274,476

UNITED STATES PATENT OFFICE 2,274,476

INSECTICIDE AND MOTH LARVAE REPELLENT

Ingenuin Hechenbleikner, Stamford, Conn., assignor to American Cyanamid Company, New York, N. Y., a corporation of Maine No Drawing. Application August 23, 1940, Serial No. 353,917

3 Claims. (Cl. 167—30)

The present invention relates to the use of symmetrical dicyclohexyl guanidine as an insecticide and moth larvae repellent. The above compounds may be prepared by the reaction between cyanogen chloride and cyclohexyl amine in an organic solvent, as follows:

2 grams (0.035 mol) of cyanogen chloride is dissolved in 25 cc. of heptane and added to a cold solution prepared by dissolving 7.3 grams (0.065 mol) of cyclohexyl amine in 25 cc. of heptane. In about five minutes, the total contents of the flask sets to a mushy solid. The mixture is then heated for six hours under reflux, whereupon the semi-solid mass in the flask is filtered and the cake dissolved in water. The water solution is extracted with ether and treated with an excess of caustic soda. A mass of fine crystals separates which may be recrystallized from a benzene and petroleum ether mixture. This is symmetrical dicyclo hexyl guanidine having a melting point of 182° C.

The above compound is particularly useful as an insecticide against aphids and other sucking insects and as a moth larvae repellent, in that it is soluble in paint and varnish makers' naphtha. This is rather surprising in view of the fact that other guanidine compounds dissolve in this solvent only when the guanidine radical was attached to an acidic residue, such as fatty acids.

A solution of dicyclo hexyl guanidine in naphtha containing from .1 to 10% of the former, may be readily sprayed or otherwise applied to cloth, fabric or the like, so that upon evaporation of the solvent, the guanidine material remains upon the treated surface and acts as a moth larvae repellent. The dicyclohexyl guanidine may be suspended in water with or without a suspension medium and sprayed upon plants to act as an insecticide against sucking insects.

The above compound is more advantageous a moth repellent than is, for instance, the substituted guanidine oleates, in that the latter have a tendency to produce a greasy feel and appearance when used in excess.

While the invention has been described with particular reference to specific embodiments, it is to be understood that it is not to be limited thereto but is to be construed broadly and restriced solely by the scope of the appended claims.

This application is derived from the parent application Serial No. 312,090, filed January 2, 1940.

I claim:

1. An insecticide comprising symmetrical dicyclohexyl guanidine.
2. A moth larvae repellent comprising symmetrical dicyclo hexyl guanidine in naphtha.
3. A moth larvae repellent comprising from .1 to 10% symmetrical dicyclohexyl guanidine dissolved in naphtha.

INGENUIN HECHENBLEIKNER.